United States Patent
Kim et al.

(10) Patent No.: US 10,030,080 B2
(45) Date of Patent: Jul. 24, 2018

(54) METHOD FOR PREPARING FINE PARTICLES WITH ENCLOSED VOIDS AND COMPOSITION INCLUDING FINE PARTICLES

(71) Applicant: Hankuck Latices Corporation, Gumi-si (KR)

(72) Inventors: Moonsoo Kim, Daegu (KR); Namwoo Kim, Daegu (KR); Sihyung Kim, Daegu (KR)

(*) Notice: Subject to any disclaimer, the term of this patent is extended or adjusted under 35 U.S.C. 154(b) by 149 days.

(21) Appl. No.: 15/090,120

(22) Filed: Apr. 4, 2016

(65) Prior Publication Data

US 2017/0283643 A1    Oct. 5, 2017

(51) Int. Cl.
- C08L 83/00 (2006.01)
- C08F 2/22 (2006.01)
- C08F 220/14 (2006.01)
- C08F 293/00 (2006.01)

(52) U.S. Cl.
CPC .............. C08F 2/22 (2013.01); C08F 220/14 (2013.01); C08F 293/00 (2013.01)

(58) Field of Classification Search
CPC ................................ C08F 2/22; C09D 133/12
See application file for complete search history.

(56) References Cited

U.S. PATENT DOCUMENTS

| | | |
|---|---|---|
| 3,615,972 A | 10/1971 | Morehouse, Jr. et al. |
| 3,637,431 A | 1/1972 | Brenneman et al. |
| 3,669,729 A | 6/1972 | Seiner |
| 3,891,577 A | 6/1975 | Kershaw et al. |
| 4,427,836 A | 1/1984 | Kowalski et al. |
| 4,468,498 A | 8/1984 | Kowalski et al. |
| 4,469,825 A | 9/1984 | Kowalski et al. |
| 4,594,363 A | 6/1986 | Blankenship et al. |
| 4,677,003 A | 6/1987 | Redlich et al. |
| 4,880,842 A | 11/1989 | Kowalski et al. |
| 4,920,160 A | 4/1990 | Chip et al. |
| 5,157,084 A | 10/1992 | Lee et al. |
| 5,360,827 A | 11/1994 | Toda et al. |
| 5,494,971 A | 2/1996 | Blankenship |
| 5,521,253 A | 5/1996 | Lee et al. |
| 6,020,435 A | 2/2000 | Blankenship et al. |
| 6,252,004 B1 | 6/2001 | Blankenship et al. |
| 7,435,783 B2 | 10/2008 | Blankenship et al. |
| 7,803,878 B2 | 9/2010 | Blankenship et al. |
| 2012/0245240 A1* | 9/2012 | Perez .................. C08F 2/22 521/57 |

FOREIGN PATENT DOCUMENTS

EP    0022633    2/1985

* cited by examiner

*Primary Examiner* — Hannah J Pak
(74) *Attorney, Agent, or Firm* — Antonio Ha & U.S. Patent, LLC

(57) ABSTRACT

There is provided a method for preparing a fine particle having an enclosed void using a core polymer containing carboxylic acid, primary middle shell monomers, and secondary hard shell monomers. The method may be a multi-staged emulsion polymerization method. The primary middle shell monomers may include a multi-functionality monomer that is a cross-linking monomer having two or more double bonds.

7 Claims, 7 Drawing Sheets

METHOD FOR PREPARING FINE PARTICLES WITH ENCLOSED VOIDS AND COMPOSITION INCLUDING FINE PARTICLES

TECHNICAL FIELD

Embodiments of the present disclosure concern methods for preparing fine particles having enclosed voids used for opacifying agents or other various purposes upon manufacturing pigments and paper coating agents.

DISCUSSION OF RELATED ART

An opacifier (or also referred to as an opacifying agent) is a substance added to a material in order to make the ensuing system opaque. An example of a chemical opacifier is titanium dioxide ($TiO_2$), which exhibits excellent hiding power. However, as titanium-containing minerals run out, the price of titanium oxide is soaring.

Research on replacements to such $TiO_2$-based opacifiers is intensively underway. An approach is to adopt, for use in pigment or paint, fine polymer particles each consisting of a core and a shell (or sheath) surrounding or encapsulating the core which have air holes or enclosed voids with air. Upon preparing such core/shell particles, there is a need for preventing free radicals from interfering with swelling when preparing core/shell particles.

SUMMARY

According to an embodiment of the present disclosure, there is provided a method for preparing fine particles having enclosed voids that may present enhanced hiding power by preventing free radicals from interfering with core swelling upon polymerization of a secondary hard shell.

According to an embodiment of the present disclosure, there is provided a method for preparing a fine particle having an enclosed void using a core polymer containing carboxylic acid, primary middle shell monomers, and secondary hard shell monomers, the method being a multi-staged emulsion polymerization method, wherein the primary middle shell monomers include a multi-functionality monomer that is a cross-linking monomer having two or more double bonds.

The method may comprise the steps of (a) encapsulating a core with a primary middle shell polymer by polymerizing the primary middle shell monomers including a non-ionic monoethylenically unsaturated monomer, a monoethylene unsaturated monomer having one or two carboxyl groups, and the multi-functionality monomer with the core polymer, (b) adding the secondary hard shell monomers, including styrene, and a neutralization swelling agent to the encapsulated core to neutralize and swell the encapsulated core while simultaneously performing hard shell polymerization to form a secondary hard shell polymer, and (c) further polymerizing the secondary hard shell monomers with the secondary hard shell polymer to prepare a fine particle having an enclosed void.

Some of the secondary hard shell monomers may be added in step (b), and the rest of the secondary hard shell monomers may be added in step (c).

In step (a), the non-ionic monoethylenically unsaturated monomer may include one or two selected from the group consisting of styrene, a-methyl styrene, p-methyl styrene, t-butyl styrene, vinyltoluene, ethylene, vinyl acetate, vinyl chloride, vinylidene chloride, (meth)acrylonitrile, (meth) acrylamide, (C1-C20) alkyl or (C3-C20) alkenyl esters of (meth)acrylic acid, such as methyl(meth)acrylate, ethyl (meth)acrylate, butyl(meth)acrylate, 2-ethylhexyl(meth) acrylate, hydroxyl ethyl(meth)acrylate, hydroxypropyl (meth)acrylate, benzyl (meth)acrylate, lauryl(meth)acrylate, oleyl(meth)acrylate, palmityl(meth)acrylate, and stearyl (meth)acrylate.

In step (a), the monoethylenically unsaturated monomer may be one or two selected from the group consisting of acrylic acid, methacrylic acid, acryloxy propionic acid, (meth)acryloxy propionic acid, itaconic acid, aconitic acid, maleic acid or anhydride, fumaric acid, crotonic acid, monomethyl maleate, monomethyl fumarate, and mono methyl itaconate.

In step (a), the multi-functionality monomer may include one or more selected from the group consisting of alkylene glycol diacrylates and dimethacrylates, such as for example, ethylene glycol diacrylate, ethylene glycol dimethacrylate, 1,3-butylene glycol diacrylate, 1,4-butylene glycol diacrylate propylene glycol diacrylate and triethylene glycol dimethyl lacrylate; 1,3-glycerol dimethacrylate; 1,1,1-trimethylol propane dimethacrylate; 1,1,1-trimethylol ethane diacrylate; pentaerythritol trimethacrylate; 1,2,6-hexane triacrylate; sorbitol pentamethacrylate; methylene bis-acrylamide, methylene bis-methacrylamide, divinyl benzene, vinyl methacrylate, vinyl crotonate, vinyl acrylate, vinyl acetylene, trivinylbenzene, triallyl cyanurate, divinyl acetylene, divinyl ethane, divinyl sulfide, divinyl ether, divinyl sulfone, diallyl cyanamide, ethylene glycol divinyl ether, diallyl phthalate, divinyl dimethyl silane, glycerol trivinyl ether, divinyl adipate; dicyclopentenyl(meth)acrylates; dicyclopentenyloxy(meth)acrylates; unsaturated esters of glycol monodicyclopentenylethers; allyl esters of 0t,[3-unsaturated mono- and dicarboxylic acids having terminal ethylenic unsaturation including allyl methacrylate, allyl acrylate, diallyl maleate, diallyl fumarate, and diallyl itaconate.

The neutralization swelling agent may include one or more selected from a volatile base, a volatile low-grade aminic amine, and a fixed or permanent base, wherein the volatile base is one or more selected from ammonia and ammonium hydroxide, wherein the volatile low-grade aminic amine is one or more selected from morpholine, trimethylamine, and trimethylamine, and 2-Amino-2-Methyl-1-Propanol, and wherein the fixed or permanent base is one or more selected from potassium hydroxide, lithium hydroxide, zinc ammonium complex, copper ammonium complex, silver ammonium complex, strontium hydroxide, and barium hydroxide.

The primary middle shell polymer may be more hydrophobic than the core polymer and more hydrophilic than the secondary hard shell polymer.

There is provided a composition including a fine particle having an enclosed void and prepared by the above method.

The composition may be a water paint or a paper coating agent.

The fine particles having enclosed voids as prepared by a method according to an embodiment of the present disclosure may present excellent hiding power. Further, a cross-linking agent is added upon polymerizing a primary middle shell polymer, minimizing the reversal between hydrophilic core and hydrophobic shell and occurrence of defective particles, preventing the shell coat from being destroyed, and increasing monadispersion efficiency.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Figure 1:
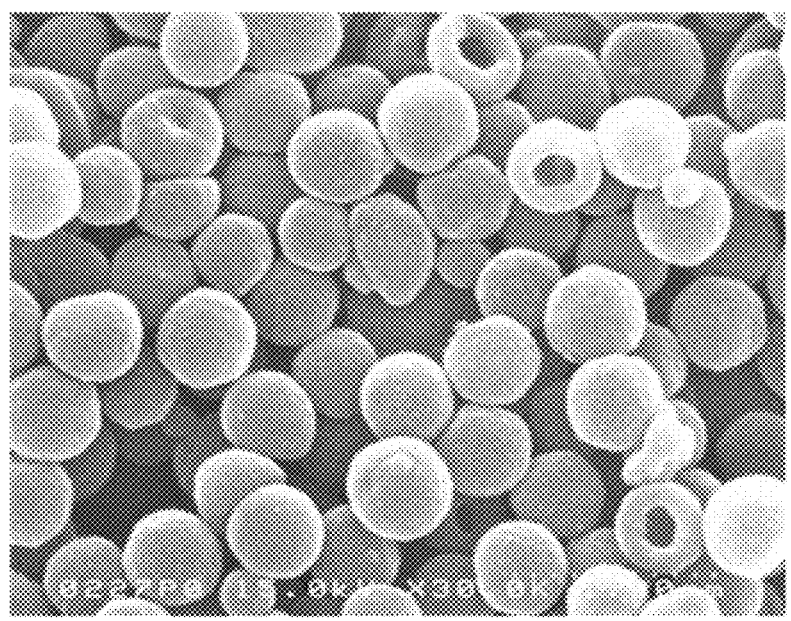
FIG. 1 is an FE-SEM picture according to a first embodiment of the present disclosure.

Embodiments of the present disclosure relate to methods for manufacturing fine particles having a hollow structure in particles after dried, which may be useful as an opacifying agent in pigments, paper coating agents, and forming compositions. In particular, embodiments of the present disclosure are directed to processes for preparing multi-layer polymer fine particles with good hiding power or opacity, which include a core including an alkali swellable polymer, one or more cross-linking primary middle shells formed on the core, and a multi-layer secondary hard shell.

According to an embodiment of the present disclosure, the primary middle shell monomers in the fine particle include multi-functionality monomers having two or more double bonds.

Specifically, the method may comprise the steps of (a) encapsulating a core with a primary middle shell polymer by polymerizing the primary middle shell monomers including a non-ionic monoethylenically unsaturated monomer, monoethylene unsaturated monomer having one or two carboxyl groups, and the multi-functionality monomer with the core polymer, (b) adding secondary hard shell monomers including styrene and a neutralization swelling agent to the core encapsulated by the primary middle shell polymer to neutralize and swell the encapsulated core while simultaneously polymerize the primary middle shell polymer to prepare fine particles having enclosed voids.

In the method, only some of the secondary hard shell monomers may be added in step (b) to perform the polymerization, and the rest of the secondary hard shell monomers may be added in step (c).

According to an embodiment of the present disclosure, a first step of the method may be preparing the core polymer containing carboxyl acid. The core polymer may be a product obtained by performing water emulsion polymerization on one or more monoethylenically unsaturated monomers containing a —HC=C< group. Here, the monomers may include 5 wt % to 70 wt % of hydrophilic monomers having a carboxylic acid group or anhydroxyl group and 30 wt % to 95 wt % of non-ionic monoethylenically unsaturated monomers not including carboxylic acid functionality.

As the nonionic monoethylenically unsaturated monomers, styrene, a-methyl styrene, p-methyl styrene, t-butyl styrene, vinyltoluene, ethylene, vinyl acetate, vinyl chloride, vinylidene chloride, (meth)acrylonitrile, (meth)acrylamide, ($C_1$-$C_{20}$) alkyl or ($C_3$-$C_{20}$) alkenyl esters of (meth)acrylic acid, such, as methyl(meth)acrylate, ethyl(meth)acrylate, butyl(meth)acrylate, 2-ethylhexyl(meth)acrylate, hydroxyl ethyl(meth)acrylate, hydroxypropyl(meth)acrylate, benzyl (meth)acrylate, lauryl(meth)acrylate, oleyl(meth)acrylate, palmityl(meth)acrylate, stearyl(meth)acrylate, or other various types of (C1-C2)alkyl or (C3-C20)alkenyl ester of (metha)acrylic acid may be used.

As the monomers including a carboxylic acid group or anhydroxyl group, acrylic acid, methacrylic acid, acryloxy propionic acid, (meth) acryloxy propionic acid, itaconic acid, aconitic acid, maleic acid or anhydride, fumaric acid, crotonic acid, monomethyl maleate, monomethyl fumarate, or mono methyl itaconate may be used.

5 wt % to 70 wt % of monomers having carboxylic acid functionality or anhydroxyl group may be sufficient to prepare the care polymer. Preferably, 10 wt % to 50 wt % of the monomers may be included.

The hydrophilic core having a carboxyl group may be neutralized and swollen using a volatile or nonvolatile base to form enclosed voids. The hydrophobic monomer which is the outer shell of the swelling core may be polymerized through multi-staged emulsion polymerization and may be then encapsulated.

A second step of the method may be to form the primary middle shell, e.g., to encapsulate the core with the primary middle shell polymer.

From a manufacturing perspective, it may be difficult to directly polymerize the secondary hard shell monomers with the hydrophilic core. Thus, such difficulty may be addressed by first polymerizing the primary middle shell polymer using low-hydrophobicity monomers.

In other words, the core polymer may be encapsulated with the primary middle shell polymer by polymerizing the primary middle sell monomer with the core polymer containing carboxyl acid. Thus, the primary middle shell polymer is more hydrophobic than the core polymer containing carboxyl acid and more hydrophilic than the secondary hard sell polymer.

Here, the primary middle shell monomers may include a non-ionic monoethylene unsaturated monomer, a monoethylene unsaturated monomer having one or two carboxyl groups, and a multi-functionality monomer with the core polymer.

A reason for using the multi-functionality monomer which is a cross-linking monomer is why the core may be neutralized and swollen after the primary middle shell monomers with a lower hydrophobicity is polymerized or after the hydrophobic secondary hard shell monomers undergo a polymerization reaction, but the primary middle shell or secondary hard shell may be destroyed by the neutralization and swelling.

According to an embodiment of the present disclosure, as the primary middle shell, monomers having a lower hydrophobicity, multi-functionality cross-linking monomers having two or more double bonds are included to minimize the destruction of the shape of particles upon neutralization and swelling, thereby addressing the defects in the previous process. For example, the multi-functionality monomers may adjust alkali swelling particle size and prevent particles from being destroyed.

For example, as the cross-linking monomers having two or more double bonds, there may be used one or more of alkylene glycol diacrylates and dimethacrylates, such as for example, ethylene glycol diacrylate, ethylene glycol dimethacrylate, 1,3-butylene glycol diacrylate, 1,4-butylene glycol diacrylate propylene glycol diacrylate and triethylene glycol dimethyl lacrylate; 1,3-glycerol dimethacrylate; 1,1, 1-trimethylol propane dimethacrylate; 1,1,1-trimethylol ethane diacrylate; pentaerythritol trimethacrylate; 1,2,6-hexane triacrylate; sorbitol pentamethacrylate; methylene bis-acrylamide, methylene bis-methacrylamide, divinyl benzene, vinyl methacrylate, vinyl crotonate, vinyl acrylate, vinyl acetylene, trivinylbenzene, triallyl cyanurate, divinyl acetylene, divinyl ethane, divinyl sulfide, divinyl ether, divinyl sulfone, diallyl cyanamide, ethylene glycol divinyl ether, diallyl phthalate, divinyl dimethyl silane, glycerol trivinyl ether, divinyl adipate; dicyclopentenyl(meth)acrylates; dicyclopentenyloxy(meth)acrylates; unsaturated esters of glycol monodicyclopentenylethers; allyl esters of 0t,[3-unsaturated mono- and dicarboxylic acids having terminal ethylenic unsaturation including allyl methacrylate, allyl acrylate, diallyl maleate, diallyl fumarate, and diallyl itaconate.

For example, 0.1 wt % to 30 wt % of cross-linking monomers, preferably 5 wt % to 15 wt % of cross-linking monomers, may be used.

For example, as the non-ionic monoethylenically unsaturated monomers used for polymerizing the primary middle shell, there may be used one or more selected from the group consisting of styrene, a-methyl styrene, p-methyl styrene, t-butyl styrene, vinyltoluene, ethylene, vinyl acetate, vinyl chloride, vinylidene chloride, (meth)acrylonitrile, (meth) acrylamide, (C1-C20) alkyl or (C3-C20) alkenyl esters of (meth)acrylic acid, such as methyl(meth)acrylate, ethyl (meth)acrylate, butyl(meth)acrylate, 2-ethylhexyl(meth) acrylate, hydroxyl ethyl(meth)acrylate, hydroxypropyl (meth)acrylate, benzyl (meth)acrylate, lauryl(meth)acrylate, oleyl(meth)acrylate, palmityl(meth)acrylate, and stearyl (meth)acrylate.

For example, 60 wt % to 98.9 wt % of the non-ionic monoethylenically unsaturated monomers may be used.

For example, as the monoethylenically unsaturated monomer having one or two carboxyl groups used for polymerizing the primary middle shell, there may be used one or more selected from the group consisting of acrylic acid, methacrylic acid, acryloxy propionic acid, (meth)acryloxy propionic acid, itaconic acid, aconitic acid, maleic acid or anhydride, fumaric acid, crotonic acid, monomethyl maleate, monomethyl fumarate, and mono methyl itaconate.

For example, 1 wt % to 10 wt % of monoethylenically unsaturated monomers having one or two carboxyl groups may be used.

A reason for including the monoethylenically unsaturated monomers having one or two carboxyl groups as the primary monomers is that, since the primary middle shell is typically designed so that the volatile and non-volatile base added for swelling the core that is performed after the shell is polymerized may pass through the core polymer, the hydrophilic monomers are included.

Here, the method for polymerizing the less-hydrophobic primary middle shell with the core polymer including the carboxylic acid may be carried out in the same reaction container where the core is formed or may be performed, with the reaction medium containing the distributed core particles relocated other reaction container.

A third step for preparing the fine particles is to add the secondary hard shell monomers, including styrene, and a neutralization swelling agent to the core encapsulated by the primary middle shell polymer to neutralize and swell the core polymer encapsulated by the primary middle shell polymer while simultaneously polymerizing the hard shell to form particles having enclosed voids or a hollow structure.

According to an embodiment of the present disclosure, polymerizing and swelling the core polymer may be performed simultaneously with polymerization of the hard shell.

For ease of description, the polymerization and swelling of the core polymer are first described.

Polymerization is performed using the core as a seed polymer, forming particles encapsulated with the primary middle shell polymer. The particles pass through the shell and are polymerized and swollen by a neutralization swelling agent. The particles absorb water from the surrounding medium, and the core/primary middle shell particles are swollen. For a reason, upon polymerizing the primary middle shell, monomers having a carboxyl group in the molecules of the primary middle shell polymer are used, and thus, the hydrophilicity is increased by the carboxyl group, rendering it easier for water to spread to the core.

Here, as the neutralization swelling agent, one or more of a volatile base including one or more of ammonia and ammonium hydroxide, volatile low-grade aliphatic amine including one or more of morpholine, trimethylamine, and trimethylamine, and a fixed or permanent base including one or more of potassium hydroxide, lithium hydroxide, zinc ammonium complex, copper ammonium complex, silver ammonium complex, strontium hydroxide, barium hydroxide may be used. Preferably, the base may be one of ammonia, potassium hydroxide, and sodium hydroxide.

When an inorganic base is used as the neutralization swelling agent, monomers with more carboxyl groups need to be included than when a volatile base is used, and thus, the amount of monomers with carboxyl groups in the primary middle shell monomers is adjusted depending on the type of the neutralization swelling agent.

When the glass transition temperature (also simply referred herein to as Tg) of the core or shell is not less than a standard room temperature, the core-shell polymers may be heated at the Tg thereof or more for effective swelling or may add a solvent to soften the polymer solid body. E.g., the size or homogeneity of the particles to be swollen by the neutralization, as expected, may be adjusted by the Tg of the primary middle shell, content of carboxyl acid, temperature at the neutralization, neutralization time, and concentration of the cross-linking monomer.

The polymerization of the secondary hard shell is performed using the secondary hard shell monomer using styrene as a major component.

Here, the secondary hard shell monomers may be hydrophobic monomers having a double bond, and such monomers raise the Tg of the polymer. As the hydrophobic monomers having a double bond, styrene is typically used.

Or, as the hydrophobic monomers having a double bond, a-methyl styrene, p-methyl styrene, t-butyl styrene, vinyltoluene, ethylene, vinyl acetate, vinyl chloride, vinylidene chloride. (meth)acrylonitrile, (meth)acrylamide, (C1-C20) alkyl or (C3-C20) alkenyl esters of (meth)acrylic acid, such as methyl(meth)acrylate, ethyl(meth)acrylate, butyl(meth) acrylate 2-ethylhexyl(meth)acrylate, hydroxyl ethyl(meth) acrylate, hydroxypropyl(meth)acrylate, benzyl (meth)acrylate, lauryl(meth)acrylate, oleyl(meth)acrylate, palmityl (meth)acrylate, or stearyl(meth)acrylate may be used.

To increase the hardness of the secondary hard shell, monomers having two or more double bonds may be used, examples of which include ethylene glycol, di (meth) acrylate, allyl (meth)acrylate, 1,3-butanediol di (meth) acrylate, 1,6-hexanediol di(metha) acrylate, diethylene glycol di (meth) acrylate, trimethylolpropane trimethacrylate, or divinylbenzene.

As the secondary hard shell monomers, 50 wt % to 100 wt %, preferably 90 wt % to 100 wt % of styrene monomers which are inexpensive are used, and 0 wt % to 10 wt % of the monomers having a double bond are used. When 10 wt % or more of the monomers having a double bond is used, defective particles failing to form hollows may be created in large quantities.

For example, according to an embodiment of the present, disclosure, after the primary middle shell is polymerized, the polymerization of the hydrophobic secondary hard shell is performed simultaneously with the neutralization for swelling the core. Preferably, while the process of polymerizing the secondary hard shell proceeds from 5% to 100%, the neutralization and swelling are also performed.

For example, some of the secondary hard shell monomers of the secondary hard shell monomers, may be added for first polymerization, and then, the remaining secondary hard shell monomers may be added without adding the neutralization swelling agent for final polymerization of the secondary hard shell polymer to form fine particles having enclosed voids.

As a specific example, only some of a total of secondary hard shell monomers to be used in the above step, preferably 5 wt % to 100 wt % of the secondary hard shell monomers, may be put in to perform polymerization, and without adding the neutralization swelling agent, the rest of the secondary hard shell monomers may be added for final polymerization of the secondary hard shell polymer, thereby preparing fine particles having enclosed voids.

For example, some part of monomer (5-100 wt. %) with a neutralization agent for polymerization of the secondary hard shalt may be added for the first polymerization, and then, the remaining monomer (95-0 wt. %) without neutralizing agent for polymerization of the secondary hard shell may be added for final polymerization, thereby preparing fine particles having enclosed voids.

When neutralization is performed immediately after polymerization of the less hydrophobic primary middle shell polymer, the primary middle shell polymer may be deformed and destroyed due to an abrupt increase in volume by the neutralization and swelling. However, according to an embodiment of the present disclosure, neutralization is performed simultaneously with the polymerization of the secondary hard shell polymer, preventing destruction of the particles due to abruptly swelling core particles and yielding a homogeneous and well-encapsulated product. For a reason, upon polymerization of the secondary hard shell, non-reacting monomers contribute to the swelling of the primary middle shell and secondary hard shell polymer.

According to an embodiment of the present disclosure, the steps of emulsion polymerization may be continuously or discretely performed to form the secondary hard shell polymer. Such steps may be carried out in the same reaction container where the core is formed or in other reaction container where the reacting medium containing the distributed core-primary middle shell particles is relocated.

According to an embodiment of the present disclosure, upon emulsion polymerization of the hydrophilic core, primary middle shell, and secondary hard shell, an anionic emulsifier and a non-ionic emulsifier may be used alone or in combination of two or more thereof.

As the anionic emulsifier, there may be used one or more of sodium lauryl sulfate, sodium dodecylbenzene sulfonate, potassium stearate, sodium dioctyl sulfosuccinate, sodium dodecyldiphenyloxide disulfonate, nonylphenoxyethylpoly(10)ethoxyethyl sulfate ammonium salt, sodium styrene sulfonate, sodium dodecyl allyl sulfosuccinate, sodium or ammonium salts of phosphate esters of ethoxylated nonylphenol, sodium octoxynol-3-sulfonate, sodium cocoyl sarcosinate, sodium 1-alkyloxy-2-hydroxypropyl sulfonate, sodium alpha-olefin (C—C) sulfonate, sulfates of hydroxyalkanols, tetrasodium N-(1,2-dicarboxy ethyl)-N-octadecyl-sulfosuccinamate, disodium N-octadecyl sulfosuccinamate, disodium alkylamido polyethoxy sulfosuccinate, and disodium ethoxylated nonylphenol half ester of sulfosuccinic acid.

As the non-ionic emulsifier, there may be used one or more of tert-octylphenoxyethylpoly(39)ethoxyethanol, dodecyl oxypoly(10)ethoxyethanol, nonylphenoxyethylpoly(90)ethoxyethanol, polyethylene glycol 2000 monooleate, ethoxylated castor oil, polyoxyethylene (20) sorbitan monolaurate, sucrose monococoate, di(2-butyl)phenoxypoly(20) ethoxyethanol, hydroxyethylcellulose-polybutyl acrylate graft copolymer, dimethyl silicone polyalkylene oxide graft copolymer, poly(ethylene oxide)-poly(butyl acrylate) block copolymer, block copolymers of propylene oxide and ethylene oxide, 2,4,7,9-tetramethyl-5-decyne-4,7-diol ethoxylated with 30 moles of ethylene oxide, N-polyoxyethylene (20)lauramide, N-lauryl-N-polyoxyethylene(30)amine, and poly(10)ethylene glycol dodecyl thioether.

For example, the emulsifiers may be used by a known method of using an emulsifier, and the amount of the emulsifiers used may be dependent upon a known multi-staged emulsion polymerization method.

In a multi-staged emulsion polymerization process, a water-soluble polymerization initiator may be used, examples of which include various types of organic hydroperoxie represented by, e.g., cumene hydroperoxide or tert-butyl peroxide. As the water-soluble polymerization initiator, redox system-based initiators may also be used, which includes a combination of reducing agents represented by, e.g., (alkali metal and ammonium salts of sulfur-containing acids, such as sodium sulfite, bisulfite, thiosulfate, hydrosuifite, sulfide, hydrosulfide or dithionite, formadinesulfinic acid, hydroxymethanesulfonic acid, acetone bisulfite. Preferred reducing agents are isoascorbic acid, sodium metabisulfite, and 2-hydroxy-2-sulfinatoacetic acid.). Specific examples of the redox system-based initiators may include, e.g., organic hydroperoxie, such as sodium, potassium, lithium, or ammonium persulfate. Given the stability of particles and the homogeneity of particle sizes, persulfate, such as potassium or ammonium persulfate, and benzoylperoxide may be preferable as the water-soluble polymerization initiator. The amount of the polymerization initiator used may be dependent upon a known multi-staged emulsion polymerization method.

Now described are exemplary embodiments of the present disclosure.

First Embodiment

Preparation of Alkali Swellable Core

A paddle stirrer, a temperature, a nitrogen influx spherical and reflux condenser were added to a 2 l, 4-neck round bottom flask. 1156.0 g of deionized water was put in a container that was then heated in a nitrogen atmosphere at 80° C. A seed monomer solution (e.g., seed pre-emulsion solution) was prepared that consists of 227.8 g of deionized water, 3.7 g of sodium dodecylbenzenesulfonate surfactant (also simply referred herein to as SDBS) (23%), 42.8 g of methyl methacrylate (also simply referred herein to as MMA), and 3.0 g of methacrylic acid (also simply referred herein to as MAA) and was then put in the heated flask. A swellable core monomer pre-emulsion solution was prepared using 10.2 g of SDBS (23%), 204.9 g of MMA, and 163.9 g of MM. 1.9 g of sodium persulfate (also simply referred herein to as SPS) was dissolved in 10.2 g of deionized water, and the resultant solution of the SPS and the deionized water was put in the heated flask and was slightly heated. Then, the temperature was maintained at 80° C. for 20 minutes to form seed particles. The remaining monomer emulsion was gradually added over about two hours. After completing the addition of the monomer emulsion, the core polymer was left at 85° C. for 30 minutes, and was then cooled down to room temperature and filtered to remove the coagulation. The core polymer exhibited a solid content of 23.01% and a particle diameter of 190 nm.

Preparation of Primary Middle Shell Polymer

A paddle stirrer, a temperature, a nitrogen influx spherical and reflux condenser were added to a 2 l, 4-neck round bottom flask, 600 g of deionized water was put in a container that was then heated in a nitrogen atmosphere at 80° C. A solution in which 0.8 g of SPS is dissolved in 20 g of deionized water and a solution including 125 g of the core polymer (the core polymer where the coagulation has been removed) previously prepared and 125 g of deionized water were put in the heated flask. A primary middle shell monomer emulsion was prepared which includes 162 g of deionized water, 3.9 g of SDBS (23%) and 35 g of n-butylmethacrylate (also simply referred herein to as n-BMA), 50 g of MMA, 10 g of butylacrylate (also simply referred herein to as BA), 5.0 g of MMA, and 2 g of arylmethacrylate (also simply referred herein to as ALMA). A solution in which 0.6 g of SPS is dissolved in 60 g of deionized water and the primary middle shell monomer emulsion were simultaneously added gradually over 40 minutes and maintained for 60 minutes to thereby prepare a primary middle shell.

Preparation of Secondary Hard Shell Polymer

After the primary middle shell was prepared as described above, a pre-emulsion solution obtained by emulsifying 40 g of ammonia water with a purity of 6.5 wt %, 100 g of de-ionized water, 3.1 g of SDBS, 120 g of styrene (also simply referred herein to as SM), 1 g of divinylbenzene (also simply referred herein to as DVB), and a solution in which 0.3 g of potassium persulfate (also simply referred herein teas KPS) is dissolved in 60 g of deionized water was put in for 60 minutes to simultaneously perform neutralization and synthesis and was then left at 80° C. for 10 minutes. A pre-emulsion solution obtained by emulsifying 100 g of deionized water, 5.1 g of SDBS, 260 g of SM, 2 g of DVB, and a solution in which 0.6 g of KPS is dissolved in 60 g of deionized water was put in for 120 minutes to perform synthesis of the remaining hard shell and was left for 60 minutes to prepare a secondary hard shell, and then cooled down to 50° C. or less, filtered, and packed. The synthesized final emulsion polymer exhibited a solid content of 30.7% and a particle diameter of 532 nm.

Second Embodiment

Emulsion polymerization was performed by the same method as that described above in connection with the first embodiment except that the content of arylmethacrylate used in synthesizing the primary middle shell polymer was 4.0 g. The synthesized final emulsion polymer exhibited a solid content of 30.7% and a particle diameter of 512 nm.

Third Embodiment

Emulsion polymerization was performed by the same method as that described above in connection with the first embodiment except that arylmethacrylate used in synthesizing the primary middle shell polymer was replaced with 2.0 g of 1,4 butanediol diacrylate. The synthesized final emulsion polymer exhibited a solid content of 30.6% and a particle diameter of 528 nm.

Fourth Embodiment

Emulsion polymerization was performed by the same method as that described above in connection with the first embodiment except that arylmethacrylate used in synthesizing the primary middle shell polymer was replaced with 4.0 g of 1,4 butanediol diacrylate. The synthesized final emulsion polymer exhibited a solid content of 30.6% and a particle diameter of 502 nm.

Comparison Example 1

Emulsion polymerization was performed by the same method as that described above in connection with the first embodiment except that arylmethacrylate used in synthesizing the primary middle shell polymer was excluded. The synthesized final emulsion polymer exhibited a solid content of 30.5% and a particle diameter of 702 nm.

Comparison Example 2

A paddle stirrer, a temperature, a nitrogen influx spherical and reflux condenser were added to a 2 l, 4-neck round bottom flask. 590 g of deionized water was put in a container that was then heated in a nitrogen atmosphere at 85° C. A solution in which 0.8 g of SPS is dissolved in 20 g of deionized water and a solution including 125 g of a core polymer (where the coagulation has been removed) as prepared by the same method described above in connection with the first embodiment and 16 g of deionized water were put in the heated flask. A primary shell monomer emulsion was prepared including 162 g of deionized water, 5.2 g of SDBS (23%) and 30 g of n-BMA, 112.5 g of MMA, and 7.5 g of MAA. A solution in which 0.6 g of SPS is dissolved in 60 g of deionized water and the primary shell monomer emulsion were simultaneously added gradually over 120 minutes and left for 60 minutes to thereby prepare a primary shell. This has been designed so that the Tg of the primary shell was 88° C. The primary shell was heated so that its temperature reaches 85° C. and was added with 40 g of ammonia water with a purity of 6.5 wt % and stirred for one hour to be swollen. A styrene monomer emulsion obtained by emulsifying a solution in which 0.6 g of SPS is dissolved in 60 g of deionized water, 100 g of deionized water, 5.1 g of SDBS, 320 g of styrene (SM), and 2 g of DVB was added to the primary shell for 120 minutes and left for 60 minutes to thereby prepare a second shell. The second shell was then cooled down to 50° C. or less, filtered using a 400 mesh filter, and packed. The synthesized final emulsion polymer exhibited a solid content of 30.5%, a viscosity high enough to render stirring difficult, and inhomogeneous particles with a particle diameter of 1000 nm or more.

Comparison Example 3

A paddle stirrer, a temperature, a nitrogen influx spherical and reflux condenser were added to a 2 l, 4-neck round bottom flask. 590 g of deionized water was put in a container that was then heated in a nitrogen atmosphere at 85° C. A solution in which 0.8 g of SPS is dissolved in 20 g of deionized water and a solution including 125 g of a core polymer (where the coagulation has been removed) as prepared by the same method described above in connection with the first embodiment and 16 g of deionized water were put in the heated flask. A primary shell monomer emulsion was prepared including 162 g of deionized water, 5.2 g of SDBS (23%) and 30 g of n-BMA, 112.5 g of MMA, and 7.5 g of MM. A solution in which 0.6 g of SPS is dissolved in 60 g of deionized water and the primary shell monomer emulsion were simultaneously added gradually over 120 minutes and left for 60 minutes to thereby prepare a primary shell. This has been designed so that the Tg of the primary shell was 88° C. A styrene monomer emulsion obtained by emulsifying a solution in which 0.6 g of SPS is dissolved in 60 g of deionized water, 100 g of deionized water, 5.1 g of SDBS, 272 g of styrene (SM), 32 g of BA, and 16 g of MM was added to the primary shell for 120 minutes and left for 60 minutes to thereby prepare a second shell. The second shell was then cooled down to 85° C., added with 40 g of ammonia water with a purity of 6.5 wt %, and stirred for one hour to be swollen. Then, the final emulsion polymer was cooled down to 50° C. or less, filtered using a 400 mesh filter, and packed. The synthesized final emulsion polymer exhibited a solid content of 30.5%, a viscosity high enough to render stirring difficult, and inhomogeneous particles with a particle diameter of 900 nm or more.

Experimental Example

Relative Comparison in Unique Particle Opacity Ratio

A binder paste was prepared by well dispersing 30.0 g of de-ionized water and 0.3 g of alkali water-soluble ASE alkali soluble emulsion thickener (e.g., HLC HISOL B108), as a viscosity agent, in 12.0 g of acryl emulsion resin (e.g., HLC HISOL AC115) and was added with 10 g of emulsion polymer synthesized according to the above embodiments or comparison examples and was stirred. The stirred composition was applied on a glass plate using an 8 mil applicator and dried under a 55% moisture condition. Then, comparison in opacity ration was made. The result is shown in Table 1 below. The opacity ratio is represented in a few symbols, e.g., ⊚, ○, Δ, and x, depending on the opacity state of the coat formed on the glass plate.

1 to 7, the first to fourth embodiments of the present disclosure may form optimal hollow particles with minimized reversion and faults between hydrophilic core and hydrophobic shell. It was verified that the reason why no opacity ratio was measured as per Comparison Example 1 is that the core particles were destroyed upon neutralization and swelling by adding no cross-linking monomers.

According to an embodiment of the present disclosure, it may be verified that addition of cross-linking monomers upon polymerization of the primary middle shell enables polymerization of the hydrophobic shell simultaneously with polymerization of the hydrophilic core without destroying the swellable core.

While the inventive concept has been shown and described with reference to exemplary embodiments thereof, it will be apparent to those of ordinary skill in the art that various changes in form and detail may be made thereto without departing from the spirit and scope of the inventive concept as defined by the following claims.

What is claimed is:

1. A method preparing a fine particle having an enclosed void, comprising:
(a) encapsulating a core polymer containing carboxylic acid with a primary middle shell polymer obtained by polymerizing primary middle shell monomers including a non-ionic monoethylenically unsaturated monomer, a monoethylene unsaturated monomer having one or more two carboxyl groups, and a multi-functionality monomer that is a cross-linking monomer having two or more double bonds with the core polymer, wherein the multi-functionality monomer is one or more selected from the group consisting of alkylene glycol diacrylates and dimethacrylates, ethylene glycol diacrylate, 1,3-butylene glycol diacrylate, 1,4-butylene glycol diacrylate, propylene glycol diacrylate, triethylene glycol dimethyl acrylate, 1,3-glycerol dimethacrylate, 1,1,1-trimethylol propane dimethacrylate, 1,1,1-trimethylol ethane diacrylate, pentaerythritol trimethacrylate, 1,2,6-hexane triacrylate, sorbitol pentamethacrylate, methylene bis-acrylamide, methylene bis-methacrylamide, divinyl benzene, vinyl methacrylate, vinyl crotonate, vinyl acrylate, vinyl acetylene, trivinylbenzene, triallyl cyanurate, divinyl acetylene,

TABLE 1

| | $1^{st}$ embodiment | $2^{nd}$ embodiment | $3^{rd}$ embodiment | $4^{th}$ embodiment | Comparison Example 1 | Comparison Example 2 | Comparison Example 3 |
|---|---|---|---|---|---|---|---|
| Opacity ratio | Δ | ○ | ○: | ⊚ | XX | X | X |

Figure 2:
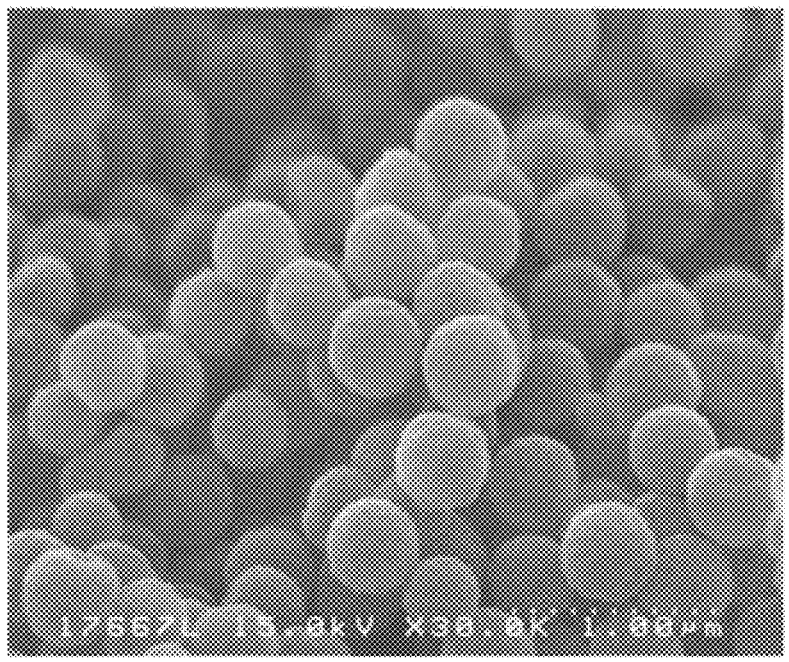
FIG. 2 is an FE-SEM picture according to a second embodiment of the present disclosure.
Figure 3:
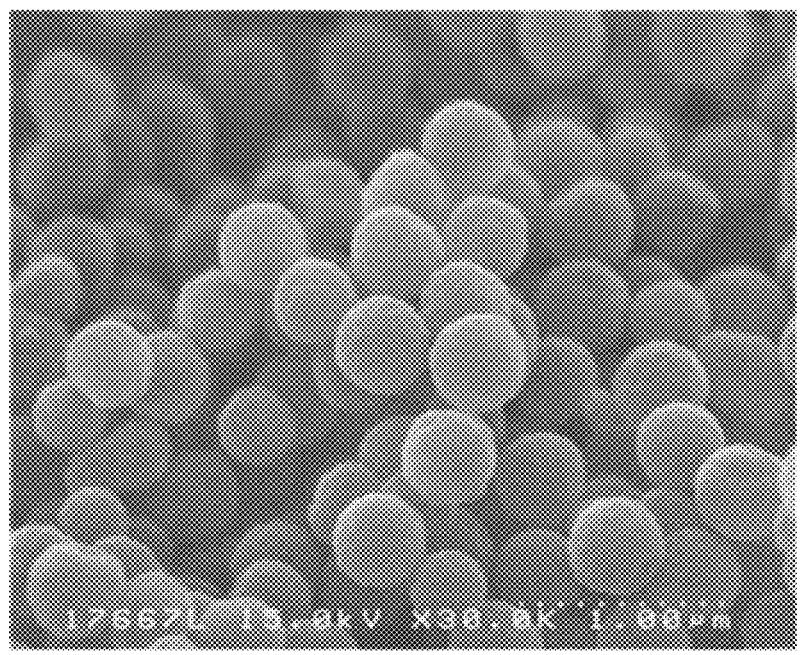
FIG. 3 is an FE-SEM picture according to third embodiment of the present disclosure.
Figure 4:
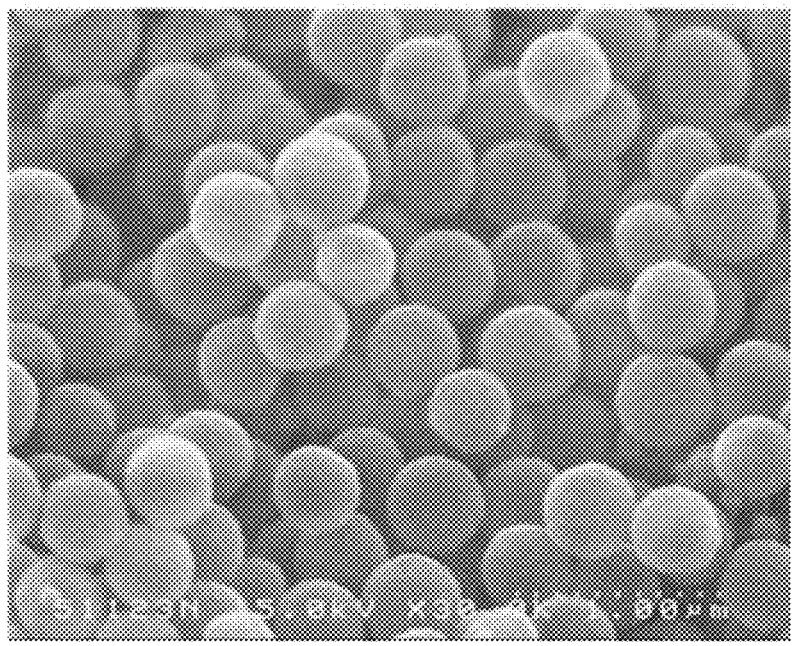
FIG. 4 is an FE-SEM picture according to a fourth embodiment of the present disclosure.
Figure 5:
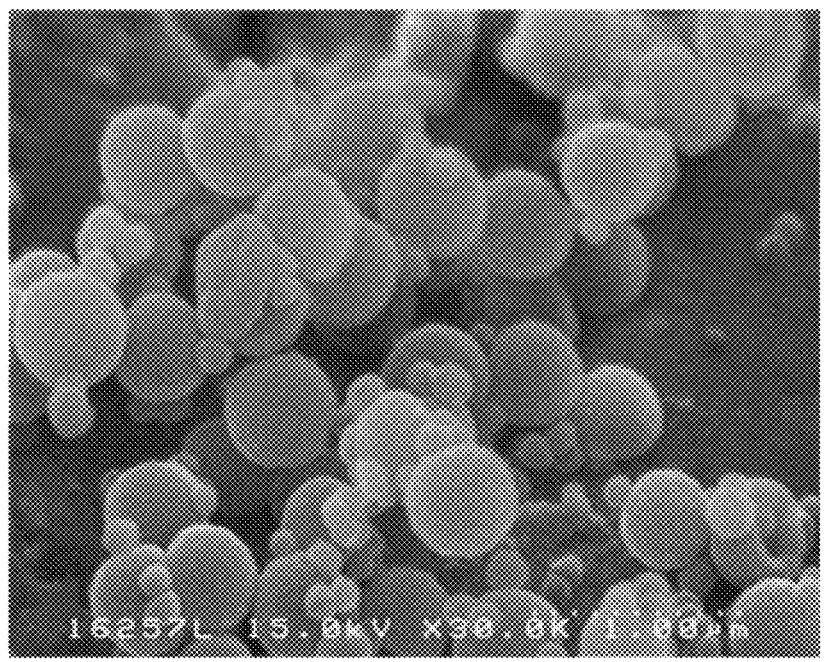
FIG. 5 is an FE-SEM picture according to a first comparison example.
Figure 6:
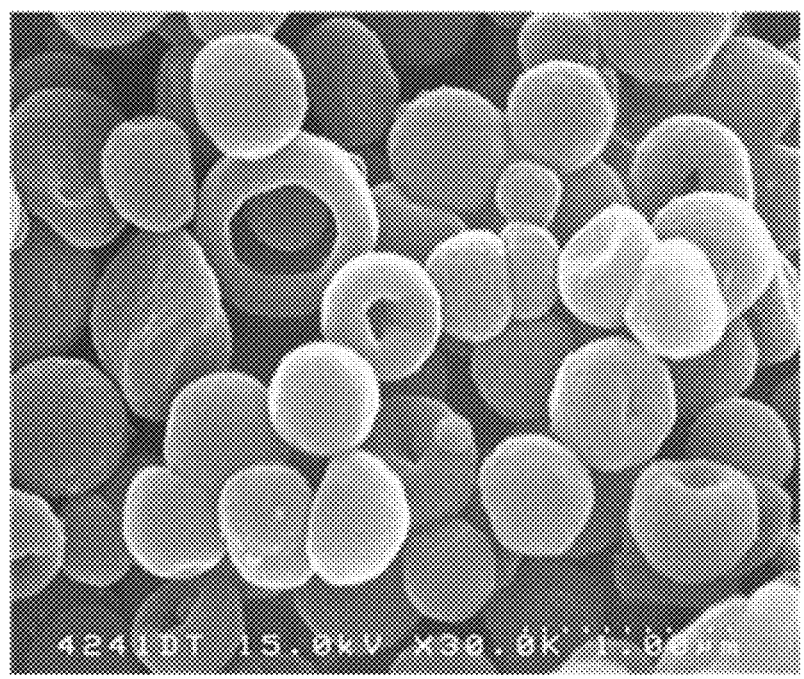
FIG. 6 is an FE-SEM picture according to a second comparison example.
Figure 7:
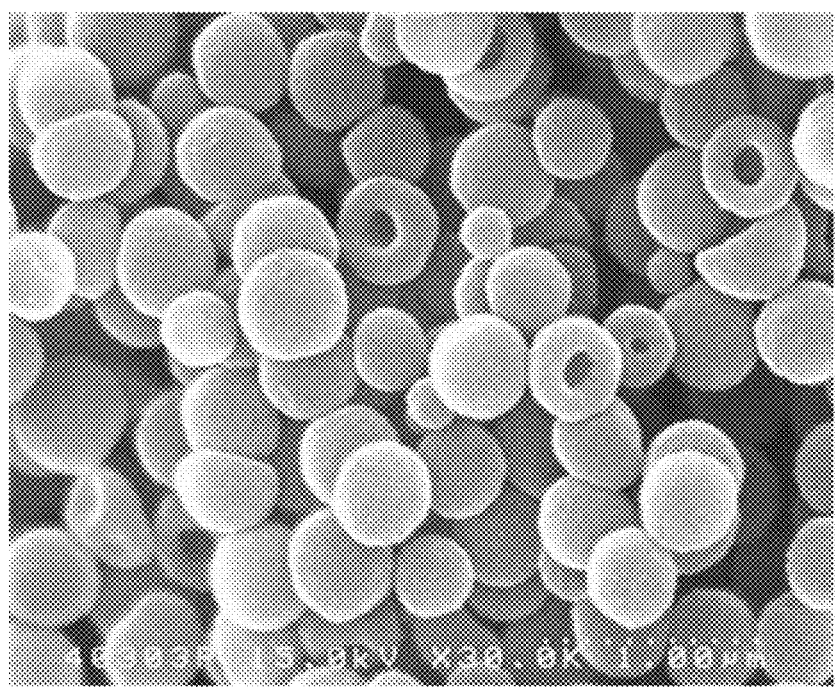
FIG. 7 is an FE-SEM picture according to a third comparison example.

⊚: Excellent opacity of film
○: Good opacity of film
Δ: Fair opacity of film
X: poor opacity of film
XX: clear of film The respective FE-SEM pictures for the embodiments and comparison examples are shown in FIGS. 1 to 7. FIGS. 1, 2, 3, 4, 5, 6, and 7, respectively, are FE-SEM pictures for the first embodiment, the second embodiment, the third embodiment, the fourth embodiment, Comparison Example 1, Comparison Example 2, and Comparison Example 3.

As evident from Table 1 above, the coats formed according to the first to fourth embodiments exhibit different opacity ratios from those of the coats formed according to Comparison Examples 1 to 3. Further, as evident from FIGS.

divinyl ethane, divinyl disulfide, divinyl ether, divinyl sulfone, diallyl cyanamide, ethylene glycol divinyl ether, diallyl phthalate, divinyl dimethyl silane, glycerol trivinyl ether, divinyl adipate, dicyclopentenyl (meth)acrylates, dicyclopentenyloxy(meth)acrylates and unsaturated esters of glycol mondicyclopentenylethers;

(b) adding secondary hard shell monomers, including styrene, and a neutralization swelling agent to the encapsulated core polymer to neutralize and swell the encapsulated core polymer while simultaneously performing hard shell polymerization to form as secondary hard shell polymer; and (c) further polymerizing the remaining secondary hard shell monomers to form the secondary hard shell polymer.

2. The method of claim 1, wherein the non-ionic monoethylenically unsaturated monomer is one or two selected from the group consisting of styrene, a-methyl styrene, p-methyl styrene, t-butyl styrene, vinyltoluene, vinyl acetate, ethylene, vinyl acetate, vinyl chloride, vinylidene chloride, (meth)acrylonitrile, (meth)acrylamide, C1-C20 alkyl or C3-C20 alkenyl esters of (meth)acrylic acid, methyl (meth)acrylate, ethyl(meth)acrylate, hydroxypropyl(meth) acrylate, benzyl(meth)acrylate, laury(meth)acrylate, oleyl (meth)acrylate, palmityl(meth)acrylate, and stearyl(meth) acrylate.

3. The method of claim 1, wherein the monoethylenically unsaturated monomer is one or two selected from the group consisting of acrylic acid, methacrylic acid, acryloxy propionic acid, (meth)acryloxy propionic acid, itaconic acid, aconitic acid, maleic acid or anhydride, fumaric acid, crotonic acid, monomethyl maleate, monomethyl fumarate, and mono methyl itaconate.

4. The method of claim 1, wherein the neutralization swelling agent is one or more selected from the group consisting of a volatile base, a volatile low-grade aminic amine, and a fixed or permanent base, wherein the volatile base is one or more selected from ammonia and ammonium hydroxide, wherein the volatile low-grade aminic amine is one or more selected from morpholine, trimethylamine, and trimethylamine, and 2-Amino-2-Methyl-1-Propanol, and wherein the fixed or permanent base is one or more selected from potassium hydroxide, lithium hydroxide, zinc ammonium complex, copper ammonium complex, silver ammonium complex, strontium hydroxide, and barium hydroxide.

5. The method of claim 1, wherein the primary middle shell polymer is more hydrophobic than the core polymer and is more hydrophilic than the secondary hard shell polymer.

6. A composition including the fine particle having an enclosed void prepared by the method of claim 1.

7. The composition of claim 6, wherein the composition is a water paint or a paper coating agent.

* * * * *